United States Patent
Hey et al.

(10) Patent No.: US 11,649,809 B2
(45) Date of Patent: May 16, 2023

(54) NEUTRALIZER FOR AN ION ENGINE, METHOD OF OPERATING A NEUTRALIZER AND ION ENGINE

(71) Applicant: Airbus Defence and Space GmbH, Taufkirchen (DE)

(72) Inventors: Franz Georg Hey, Taufkirchen (DE); Nils Gerrit Kottke, Taufkirchen (DE); Günter Kornfeld, Elchingen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 17/119,039

(22) Filed: Dec. 11, 2020

(65) Prior Publication Data
US 2021/0180575 A1   Jun. 17, 2021

(30) Foreign Application Priority Data

Dec. 13, 2019   (EP) ..................................... 19215981

(51) Int. Cl.
*F03H 1/00* (2006.01)
*H05H 1/54* (2006.01)
*B64G 1/40* (2006.01)

(52) U.S. Cl.
CPC ............. *F03H 1/0043* (2013.01); *H05H 1/54* (2013.01); *B64G 1/405* (2013.01)

(58) Field of Classification Search
CPC ............................. F03H 1/0025; F03H 1/0043
See application file for complete search history.

(56) References Cited

U.S. PATENT DOCUMENTS

| 2013/0125526 A1 | 5/2013 | Marchandise et al. |
| 2014/0354138 A1* | 12/2014 | Rand ............. H01J 1/025 313/633 |
| 2018/0023550 A1 | 1/2018 | Tsay et al. |

FOREIGN PATENT DOCUMENTS

| WO | 2017176843 A1 | 10/2017 |
| WO | 2019116371 A1 | 6/2019 |

OTHER PUBLICATIONS

Korkmaz "Global Numerical Model for the Assessment of the Effect of Geometry and Operation Conditions on Insert and Orifice Region Plasmas of a Thermionic Hollow Cathode Electron Source" (Year: 2014).*
Hot Cathode : Wikipedia (Year: 2018).*
European Search Report; priority document.
(Continued)

*Primary Examiner* — Arun Goyal
*Assistant Examiner* — William L Breazeal
(74) *Attorney, Agent, or Firm* — Greer, Burns & Crain, Ltd.

(57) ABSTRACT

A neutralizer suitable for use in an ion engine comprises a halogen gas source and an electrode tube comprising an inlet opening connected to the halogen gas source for supplying a halogen gas provided by the halogen gas source into the electrode tube, a discharge space for generating a plasma from the halogen gas supplied into the electrode tube, and an outlet opening for discharging the plasma generated in the discharge space and free electrons from the electrode tube. An electron emitter is arranged in the discharge space of the electrode tube, which is at least partially made of tungsten, a tungsten alloy or a tungsten composite material containing at least one of iridium, rhenium, ruthenium, rhodium and osmium.

14 Claims, 2 Drawing Sheets

(56) References Cited

OTHER PUBLICATIONS

Seth Joseph Thompson, "Iodine Compatible Hollow Cathode" Jun. 14, 2019, https:/mountainscholar.org/bitstream/handle/10217/195377/Thompson_colostate_0053N_15423.pdf?sequence=1&isAllowed=y.

Polzin et al., "Propulsion System Development for the Iodine Satellite (iSAT) Demonstration Mission" Jul. 4, 2015, http:/erps.spacegrant.org/uploads/images/2015Presentations/IEPC-2015-09_ISTS-20-15-b-09.pdf.

Vintizenko et al, "Hollow-Cathode Low-Presser Arc Discharges and Their Application in Plasma Generators and Charged-Particle Sources" Russian Physics Journal, Sep. 1, 2001, pp. 927-936, https:/link.springer.com/content/pdf/10.1023/A:1014353721504.pdf.

Poole, "Emission from Hollow Cathodes" Journal of Applied Physics, Sep. 1, 1955, pp. 1176-1179.

\* cited by examiner

NEUTRALIZER FOR AN ION ENGINE, METHOD OF OPERATING A NEUTRALIZER AND ION ENGINE

CROSS-REFERENCES TO RELATED APPLICATIONS

This application claims the benefit of the European patent application No. 19215981.2 filed on Dec. 13, 2019, the entire disclosures of which are incorporated herein by way of reference.

FIELD OF THE INVENTION

The present invention relates to a neutralizer suitable for use with an ion engine. Furthermore, the invention relates to a method of operating such a neutralizer. Finally, the invention relates to an ion engine equipped with such a neutralizer.

BACKGROUND OF THE INVENTION

Ion engines used to propel spacecraft generate thrust and thus propulsion energy by first ionizing a propellant gas and then accelerating the gas particles in an electric field. In a neutralizer, the accelerated gas particles are electrically neutralized and finally ejected in the form of a beam at a speed of 10 to 130 km/s. Common neutralizers are usually designed as a hollow cathode, which can include, for example, an LaB6 or barium dispenser cathode as an electron emitter.

At present, ion engines are generally operated with xenon as propellant. Xenon is however expensive. There are, therefore, efforts to develop ion engines that can be operated with alternative propellants with good availability and a high storage density, such as iodine or other halogens. However, these alternative propellants are incompatible with the known neutralizers, since the propellants contaminate the materials of the dispenser cathodes when the neutralizers are operated at high temperatures and can thus impair the functionality of the dispenser cathodes.

SUMMARY OF THE INVENTION

The present invention is directed to an object of providing a neutralizer suitable for use in an ion engine operable with iodine and/or another halogen as propellant. Furthermore, the invention is directed to an object of providing a method of operating such a neutralizer. Finally, the invention is directed to an object of providing an ion engine equipped with such a neutralizer.

A neutralizer suitable for use in an ion engine comprises a halogen gas source and an electrode tube. The halogen gas source is adapted to provide a halogen gas, in particular, gaseous iodine. The halogen gas source may comprise a storage container in which the halogen to be stored is contained in solid or gaseous form. If the halogen is stored in solid form in the storage container of the halogen gas source, the halogen gas source preferably further comprises an evaporator which is adapted to convert the halogen from the solid to the gaseous state.

The electrode tube has an inlet opening connected to the halogen gas source for supplying the halogen gas provided by the halogen gas source into the electrode tube. Furthermore, the electrode tube includes a discharge chamber arranged inside the electrode tube for generating a plasma from the halogen gas supplied into the electrode tube. Finally, the electrode tube is provided with an outlet opening for discharging the plasma generated in the discharge space and free electrons from the electrode tube.

During operation of the neutralizer, the halogen gas, which is supplied into the electrode tube via the inlet opening of the electrode tube, is at least partially ionized in the discharge space of the electrode tube, i.e., a plasma and free electrons are generated in the discharge space of the electrode tube. The halogen gas is ionized by electrons which collide with initially neutral gas atoms in the discharge space of the electrode tube and thus ionize them. These electrons are provided by an electron emitter arranged in the discharge space of the electrode tube. The electron emitter is at least partially made of tungsten, a tungsten alloy, in particular a tungsten alloy having a high melting temperature, or a tungsten composite material containing at least one of iridium, rhenium, ruthenium, rhodium and osmium.

During operation of the neutralizer, the electron emitter reaches very high operating temperatures of up to 3000° C. This causes the material of the electron emitter to evaporate, which usually causes erosion and consequently a significant shortening of the electron emitter's lifetime. However, in the neutralizer described here, the tungsten vaporized by the electron emitter, which is at least partially made of tungsten, reacts with the halogen present in the discharge space of the electrode tube to form a tungsten halide, for example tungsten iodide. The tungsten halide is stochastically transported back to the electron emitter, where it decomposes back into its constituents due to the high temperatures prevailing on the surface of the electron emitter. The tungsten released during this decay reaction is deposited on the surface of the electron emitter and thus counteracts the erosion of the electron emitter. The neutralizer is therefore suitable for use in an ion engine that can be operated with iodine and/or another halogen as propellant.

In case the electron emitter is at least partially made of a tungsten composite material containing at least one of iridium, rhenium, ruthenium, rhodium and osmium, the additional components of the composite material may lower the emission energy for electrons and thus allow lower operating temperatures.

The neutralizer is preferably equipped with a heating device to heat the electron emitter. The heating device is preferably designed to heat the electron emitter to temperatures of up to 2000° C.

The electron emitter may, for example, be designed in the form of a tungsten filament. The tungsten filament can have, for example, a spiral or meander shape.

The electrode tube is preferably designed in the form of a hollow cathode. Neutralizers equipped with a hollow cathode are distinguished from other electron source concepts by their high charge carrier density and are therefore particularly advantageous in space applications.

The neutralizer may also include a keeper electrode arranged adjacent to the outlet opening of the electrode tube. The keeper electrode is preferably designed in the form of a keeper anode. In such a design of the neutralizer, a positive voltage is applied to the keeper electrode so that the electrons escaping from the plasma in the discharge space of the electrode tube are accelerated towards the keeper anode and can exit the electrode tube through the outlet opening of the electrode tube. The keeper electrode is preferably designed so that it at least partially surrounds a region of the electrode tube adjacent to the outlet opening of the electrode tube. Furthermore, the keeper electrode preferably also has an outlet opening through which the electrons accelerated in the direction of the keeper electrode can pass. The electrons can then be used to neutralize an ion beam generated by an ion engine equipped with the neutralizer.

Additionally or alternatively, a potential difference can also be applied between the electron emitter and the electrode tube, which ensures that the gas discharge in the discharge space of the electrode tube can be ignited even without a keeper electrode. The neutralizer is then distinguished by a particularly simple design, since a keeper electrode is not required.

An additional tungsten source may be arranged in the discharge space of the electrode tube, which is adapted to react with the halogen gas supplied into the electrode tube to form a tungsten halide. The tungsten halide formed by the reaction of the additional tungsten source with the halogen gas also decays back into its constituents at the surface of the electron emitter, so that additional tungsten can be deposited on the surface of the electron emitter. This can further counteract the erosion of the electron emitter, which is at least partially made of tungsten. The additional tungsten source is preferably unheated to promote the reaction of the tungsten to tungsten halide. However, it is also conceivable to heat the additional tungsten source in a controlled manner or to couple it thermally to a heat source to ensure a desired rate of tungsten iodide formation.

In a method of operating a neutralizer intended for use in an ion engine, a halogen gas is supplied into the electrode tube through an inlet opening of an electrode tube. From the halogen gas supplied into the electrode tube, a plasma is generated in a discharge space of the electrode tube, i.e., the halogen gas is ionized by free electrons which collide with initially neutral gas atoms in the discharge space of the electrode tube. The free electrons are emitted by an electron emitter located in the discharge space of the electrode tube. The electron emitter is at least partially made of tungsten, a tungsten alloy, in particular a tungsten alloy having a high melting temperature, or a tungsten composite material containing at least one of iridium, rhenium, ruthenium, rhodium and osmium. The plasma generated in the discharge chamber and the free electrons are discharged from the electrode tube through an outlet opening of the electrode tube.

Preferably the electron emitter is heated.

In a preferred embodiment of the method, the electron emitter is designed in the form of a tungsten filament. Additionally or alternatively, the electrode tube can be designed in the form of a hollow cathode The plasma can be generated with the aid of a keeper electrode arranged adjacent to the outlet opening of the electrode tube. The electrode tube and the keeper electrode can then be connected to a common energy source.

However, a potential difference can also be applied between the electron emitter and the electrode tube. If desired, the provision of a keeper electrode can then be dispensed with An additional tungsten source may be located in the discharge space of the electrode tube, which reacts with the halogen gas supplied into the electrode tube to form a tungsten halide.

An ion engine includes a neutralizer described above. The ion engine can preferably be operated with a halogen, especially iodine, as propellant.

BRIEF DESCRIPTION OF THE DRAWINGS

A preferred embodiment of the invention is now explained in more detail with reference to the attached schematic drawings, wherein.

DETAILED DESCRIPTION OF THE PREFERRED EMBODIMENTS

Figure 1:
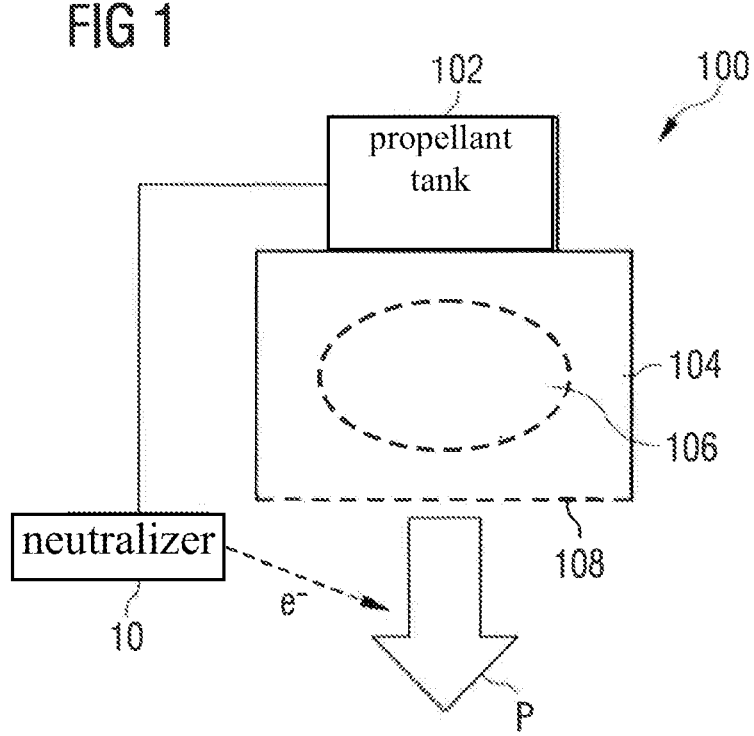
FIG. 1 shows a schematic diagram of an ion engine.

An ion engine 100 shown in FIG. 1 comprises a propellant tank 102 filled with a halogen propellant, especially iodine. The propellant contained in the propellant container 102 is preferably in a gaseous or solid state. During operation of the ion engine 100, the propellant gas is supplied from the propellant tank 102 into an ionizer chamber 104. In the ionizer chamber 104, the propellant gas is ionized in the usual way, so that a positively charged plasma 106 is created in the ionizer chamber 104. As indicated by the arrow P in FIG. 1, the positively charged gas ions leave the ionizer chamber 104 through gas outlet openings 108 provided in a wall of the ionizer chamber 104 and are neutralized by electrons provided by a neutralizer 10.

Figure 2:
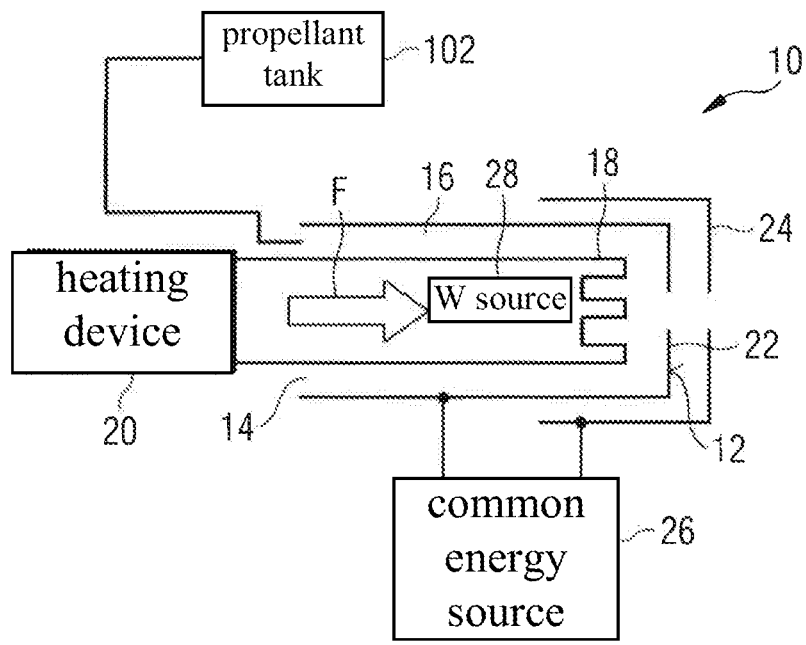
FIG. 2 shows an embodiment of a neutralizer suitable for use in the ion engine according to FIG. 1.

A detailed representation of a first embodiment of the neutralizer 10 is shown in FIG. 2. The neutralizer 10 comprises a halogen gas source, which here is formed by the propellant tank 102 of the ion engine 100. However, it is also conceivable to equip the neutralizer 10 with a halogen gas source formed separately from the propellant tank 102 of the ion engine 100. Furthermore, the neutralizer 10 comprises an electrode tube 12 designed in the form of a hollow cathode. The electrode tube 12 has an inlet opening 14 which is connected to the halogen gas source, i.e., the propellant tank 102, so that halogen gas, i.e., especially iodine gas, can be supplied into the electrode tube 12 through the inlet opening 14 as indicated by the arrow F.

In an interior of the electrode tube 12 a discharge space or chamber 16 is defined, in which an electron emitter 18 is arranged, which is at least partly made of tungsten, a tungsten alloy, in particular a tungsten alloy having a high melting temperature, or a tungsten composite material containing at least one of iridium, rhenium, ruthenium, rhodium and osmium. In particular, the electron emitter 18 is designed in the form of a tungsten filament and is connected to a heating device 20, which is capable of heating the electron emitter 18 to a temperature of up to 2000° C. In the area of an end opposite the inlet opening 14, the electrode tube 12 is provided with an outlet opening 22. Adjacent to the outlet opening 22, a keeper electrode 24 is provided, which is here designed in the form of a keeper anode. The electrode tube 12 and the keeper electrode 24, which here is designed in the form of a hollow cathode, are connected to a common energy source 26. Finally, an additional tungsten source 28 is provided in the electrode tube 12, which here is designed in the form of an unheated insert.

During operation of the neutralizer 10, the halogen gas is supplied into the electrode tube 12 via the inlet opening 14 of the electrode tube 12. The electron emitter 18 heated by the heating device 20 emits electrons which collide with the initially still neutral molecules of the halogen gas flowing into the discharge space 16 of the electrode tube 12. This ionizes the halogen gas, i.e., a plasma and free electrons are created in the discharge space 16 of the electrode tube 12. The plasma and the free electrons are discharged from the discharge chamber 16 via the outlet opening 22. The free electrons are used to neutralize the propellant plasma emerging from the ionizer chamber 104 of the ion engine 100, as shown in FIG. 1.

At the high operating temperatures of the electron emitter 18 occurring during the operation of the neutralizer 10, the tungsten material of the electron emitter 18 evaporates into the discharge space 16, which usually causes erosion and consequently a significant shortening of the life of the electron emitter. In the neutralizer 10 described here, however, the vaporized tungsten reacts with the halogen gas also present in discharge space 16 of the electrode tube 12, so that a tungsten halide, for example tungsten iodide, is formed. The material of the additional tungsten source 28 also reacts with the halogen gas to form tungsten halide, especially tungsten iodide.

Due to the relatively high gas density in the discharge chamber 16 of the electrode tube 12, the tungsten halide formed in the discharge chamber 16 is stochastically transported back to the electron emitter 18, where it decays back into its constituent parts due to the high temperatures prevailing on the surface of the electron emitter 18. The tungsten released during this decay reaction is deposited on the surface of the electron emitter 18 and thus counteracts the erosion of the electron emitter 18.

Figure 3:
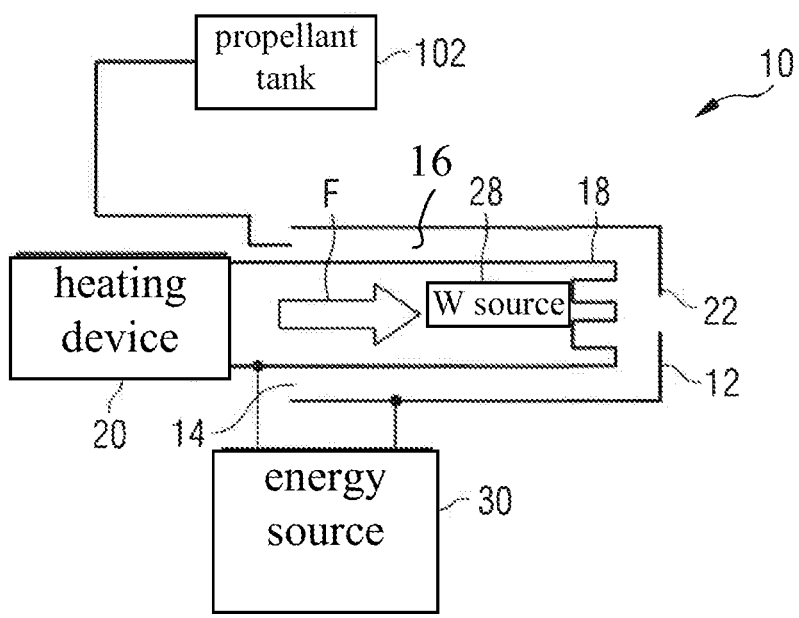
FIG. 3 shows an alternative embodiment of a neutralizer suitable for use in the ion engine according to FIG. 1.

The alternative design of a neutralizer 10 shown in FIG. 3 differs from the arrangement shown in FIG. 2 in that the electron emitter 18 and the electrode tube 12 are connected to an energy source 30, through which a potential difference is applied between the electron emitter 18 and the electrode tube 12. The potential difference between the electron emitter 18 and the electrode tube 12 makes it possible that the gas discharge in the discharge space 16 of the electrode tube 12 can be ignited even without a keeper electrode. In the neutralizer 10 shown in FIG. 3 a keeper electrode therefore can be dispensed with.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A neutralizer for use in an ion engine, comprising:
   a halogen gas source;
   an electrode tube comprising an inlet opening connected to the halogen gas source for supplying a halogen gas provided by the halogen gas source into the electrode tube,
   a discharge space for generating a plasma from the halogen gas supplied into the electrode tube, and
   an outlet opening for discharging the plasma generated in the discharge space and free electrons from the electrode tube;
   an electron emitter arranged in the discharge space of the electrode tube, the electron emitter being at least partially made of tungsten, a tungsten alloy or a tungsten composite material containing at least one of iridium, rhenium, ruthenium, rhodium and osmium; and,
   a heating device configured to heat the electron emitter to temperatures of up to 2000° C.

2. The neutralizer according to claim 1, wherein the electron emitter is configured as a tungsten filament.

3. The neutralizer according to claim 1, wherein the electrode tube is configured as a hollow cathode.

4. The neutralizer according to claim 1, further comprising a keeper electrode arranged adjacent to the outlet opening of the electrode tube.

5. The neutralizer according to claim 4, wherein the electrode tube and the keeper electrode are connected to a common energy source.

6. The neutralizer according to claim 1, wherein a potential difference is applied between the electron emitter and the electrode tube.

7. The neutralizer according to claim 1, wherein an additional tungsten source is arranged in the discharge space of the electrode tube, which is configured to react with the halogen gas supplied into the electrode tube to form a tungsten halide.

8. A method of operating a neutralizer for use in an ion engine, the method comprising supplying a halogen gas into an electrode tube through an inlet opening of the electrode tube;
   generating a plasma and free electrons from the halogen gas supplied into the electrode tube in a discharge space of the electrode tube, wherein an electron emitter is arranged in the discharge space of the electrode tube and being at least partially made of tungsten, a tungsten alloy or a tungsten composite material containing at least one of iridium, rhenium, ruthenium, rhodium and osmium emits emitter electrons; and
   discharging the plasma generated in the discharge space and the free electrons from the electrode tube through an outlet opening of the electrode tube,
   wherein the electron emitter is heated to a temperature of up to 2000° C.

9. The method according to claim 8, wherein the electron emitter is configured as a tungsten filament.

10. The method according to claim 8, wherein the electrode tube is configured as a hollow cathode.

11. The method according to claim 8,
    wherein the plasma is generated aided by a keeper electrode arranged adjacent to the outlet opening of the electrode tube, and
    wherein the electrode tube and the keeper electrode are connected to a common energy source.

12. The method according to claim 8, wherein a potential difference is applied between the electron emitter and the electrode tube.

13. The method according to claim 8, wherein an additional tungsten source is arranged in the discharge space of the electrode tube, which reacts with the halogen gas supplied into the electrode tube to form a tungsten halide.

14. An ion engine having a neutralizer according to claim 1.

* * * * *